(No Model.)
H. S. HIGINBOTHAM.
WHIFFLETREE HOOK.
No. 250,357. Patented Dec. 6, 1881.
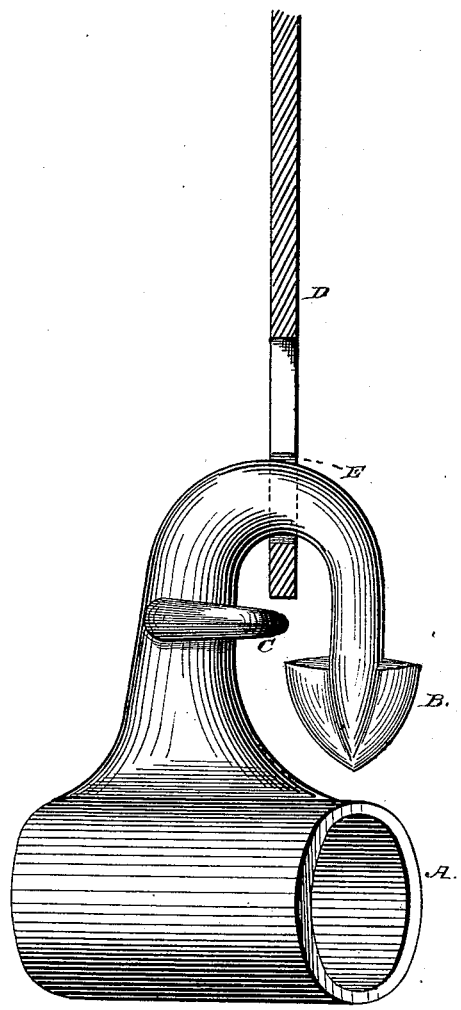
WITNESSES
Fred. G. Dieterich
P. C. Dieterich
H. S. Higinbotham
INVENTOR
by J. M. C. Perkins
Attorney

UNITED STATES PATENT OFFICE.

HARLOW S. HIGINBOTHAM, OF ALLEGAN, MICHIGAN.

WHIFFLETREE-HOOK.

SPECIFICATION forming part of Letters Patent No. 250,357, dated December 6, 1881.

Application filed September 3, 1881. (No model.)

*To all whom it may concern:*

Be it known that I, HARLOW S. HIGINBOTHAM, of Allegan, in the county of Allegan and State of Michigan, have invented certain new and useful Improvements in Whiffletree-Hooks; and I do hereby declare that the following is a full, clear, and exact description of the invention, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention its nature and extent will be shown in the claims.

My invention relates to an improvement in whiffletree-hooks.

The object of my invention is to prevent the disengagement of the cockeye or tug from the whiffletree-hook.

A represents the socket which is attached to the end of the whiffletree. B is the flattened conical-shaped head, provided with shoulders. C is a collar or shoulder on the main shaft of the hook, and is opposite and a little above the head B. This collar does not cover the outside of the hook. The cockeye E is obstructed by the collar C or the head B when it is thrown backward, and thus a disengagement of the cockeye and hook is avoided. The cockeye E can only be disconnected from the hook when it is made to enter diagonally the space between the collar C and the head B.

Having now described my invention, what I claim, and desire to secure by Letters Patent, is—

A whiffletree-hook provided with the collar C on the inside, and partially surrounding the main stem of the hook, and the flattened conical head B, so arranged in relation to each other that the cockeye E can be disengaged from the hook only by the indirect passage of the cockeye E between the shoulder C and the head B, substantially as shown and described, and for the purposes herein set forth.

In testimony that I claim the foregoing I have hereunto set my hand this 29th day of June, 1881.

HARLOW S. HIGINBOTHAM.

Witnesses:
 JOSEPH W. CHADDOCK,
 CHARLES R. WILKES.